United States Patent [19]
Williams

[11] Patent Number: 5,598,435
[45] Date of Patent: Jan. 28, 1997

[54] DIGITAL MODULATION USING QAM WITH MULTIPLE SIGNAL POINT CONSTELLATIONS NOT EQUAL TO A POWER OF TWO

[75] Inventor: Richard G. C. Williams, Suffolk, England

[73] Assignee: British Telecommunications public limited company, London, England

[21] Appl. No.: 192,092

[22] Filed: Feb. 4, 1994

[30]    Foreign Application Priority Data

Dec. 23, 1993 [EP]    European Pat. Off. .............. 93310461

[51] Int. Cl.$^6$ .............................. H04K 1/10; H03M 7/02; H04L 17/02
[52] U.S. Cl. .......................... 375/261; 375/269; 375/272; 375/273; 375/281; 371/43; 332/100; 332/103; 341/83; 341/174
[58] Field of Search .................................. 375/260, 261, 375/269, 272, 273, 281; 371/43; 332/100, 103; 341/83, 174

[56]    References Cited

U.S. PATENT DOCUMENTS

| | | | |
|---|---|---|---|
| 4,679,227 | 7/1987 | Hughes-Hartogs | 375/58 |
| 4,731,816 | 3/1988 | Hughes-Hartogs | 375/39 |
| 4,833,706 | 5/1989 | Hughes-Hartogs | 375/98 |
| 4,993,046 | 2/1991 | Saito | 371/43 |
| 5,214,656 | 5/1993 | Chung | 371/43 |
| 5,222,077 | 6/1993 | Krishnan | 375/261 |
| 5,237,292 | 8/1993 | Chethik | 332/103 |
| 5,305,352 | 4/1994 | Calderbank | 375/261 |
| 5,363,410 | 11/1994 | Hayashi | 375/281 |

FOREIGN PATENT DOCUMENTS

WO86/07223    12/1986    WIPO .

OTHER PUBLICATIONS

Chow et al, "Bandwidth Optimization for High Speed Data Transmission Over Channels with Severe Intersymbol Interference", IEEE Global Telecommunications Conference, Orlando, US, Dec. 6–9, 1992, pp. 59–63.

Bingham, "Multicarrier Modulation for Data Transmission: An Idea Whose Time Has Come", IEEE Communications Magazine, vol. 28, No. 5, May 1990, Piscataway, US, pp. 5–14.

Feig, "Frequency Division Multiplexing With Channel Constraints", IEEE International Telecommunications Symposium, Rio de Janeiro, Sep. 3–6, 1990, IEEE, New York, 1990, pp. 287–291.

Lang et al, "A Leech Lattice Modem", IEEE Journal on Selected Areas in Communications, vol. 7, No. 6, Aug. 1989, pp. 968–973.

CCITT Draft Recommendation V.34, "A Modem Operating At Data Signalling Rates of Up to 28800 Bit/s For Use on the General Switched Telephone Network and on Leased Point-to-Point 2-Wire Telephone-Type Circuits".

*Primary Examiner*—Wellington Chin
*Assistant Examiner*—Vijay Shankar
*Attorney, Agent, or Firm*—Nixon & Vanderhye P.C.

[57]    ABSTRACT

Data are transmitted using multiple carriers modulated by quadrature amplitude modulation. In general, the carriers carry different numbers of bits, to exploit the fact that the properties of a transmission path are more favorable to carriers at some frequencies than to those at others. The bit allocation process is made closer to optimum by permitting allocation of a non-integer number of bits to a carrier. Input bits are grouped for several carriers and this binary representation is converted to a number representation in which the base of each digit corresponds to the number of points in the QAM constellation for a respective carrier (or to this number divided by a power of two).

12 Claims, 1 Drawing Sheet
DIGITAL MODULATION USING QAM WITH MULTIPLE SIGNAL POINT CONSTELLATIONS NOT EQUAL TO A POWER OF TWO

BACKGROUND OF THE INVENTION

1. Field of the Invention

The present invention relates to modulation systems for the transmission of information in digital form.

2. Description With Regard to Related Art

In particular, the invention is concerned with multi-frequency systems, where, rather than using all the available bandwidth by wideband modulation of a single carrier, a number of carriers each occupy a portion of the bandwidth, the total number of bits to be transmitted being distributed among the carriers. If the properties of the channel to be used are uniform across all portions of the available bandwidth, then there is no advantage in this; but if, on the other hand, channel characteristics such as noise level or distortion vary with frequency then one can obtain an improvement in bit rate for a given bit error rate (or vice versa) by tailoring the bit rate on each carrier according to the characteristics of the channel at the relevant frequency. Preferably the allocation of bits is performed dynamically—i.e., by continually readjusting the allocation to take account of variations in the channel.

It is proposed that transmission on each channel takes place using quadrature amplitude modulation, where a carrier is set, during each of successive symbol periods, to a phase and amplitude corresponding to a symbol to be transmitted (normally by controlling the amplitudes of two phase-quadrature carriers). The set of allowable discrete combinations can conveniently be plotted as a set of points on a phase diagram and is commonly referred to as a constellation. In many systems the number of points in the constellation is a power of two; so that, for example, a symbol selected from a sixteen-point constellation carries four bits.

BRIEF SUMMARY OF THE INVENTION

This invention provides apparatus and method for transmission of data using quadrature amplitude modulation, including the use of:

(a) modulation means controllable to produce consecutive output symbols in each of which a plurality of carriers of different frequencies each have a selected phase and amplitude;

(b) mapping means for controlling the modulation of a carrier in accordance with a signal point constellation having a plurality of signal points, wherein at least two carriers are controlled in accordance with signal point constellations having mutually different numbers of points and wherein at least two constellations have a number of points not equal to a power of two;

(c) conversion means operable to receive a group of bits to be transmitted by two or more carriers controlled in accordance with constellations having a number of points not equal to a power of two and to generate from the bit group, considered as a binary number, the digits of a number having the same numerical value, the base of each digit being the number of points in the constellation employed for a respective carrier, the mapping means being responsive to a respective digit to select a point from the relevant constellation.

If desired, signal quality reports may be received for determining, as a function of the quality reports, a constellation size for each channel, and communicating the constellation sizes to the receiver. The mapping means may be arranged to control at least one carrier in accordance with a constellation having a number of points which is the product of an even and an odd number, and is responsive to one or more input bits not processed by the conversion means to select between an even number of groups of points and to the respective said digit to select among the points of a group.

The invention also provides an apparatus and method for transmission of data using quadrature amplitude modulation, including the use of:

(a) modulation means controllable to produce consecutive output symbols in each of which a plurality of carriers of different frequencies each have a selected phase and amplitude;

(b) mapping means for controlling the modulation of a carrier in accordance with a signal point constellation having a plurality of signal points, wherein at least two carriers are controlled in accordance with signal point constellations having mutually different numbers of points and wherein at least two constellations have a number of points not equal to a power of two;

(c) conversion means operable to receive a group of bits to be transmitted by two or more carriers controlled in accordance with constellations having a number of points not equal to a power of two and to generate from the bit group, in accordance with a shell mapping algorithm, a set of numbers each identifying a point within a respective constellation.

In addition, the invention provides apparatus and method for transmission of data using quadrature amplitude modulation, including the use of:

(a) modulation means controllable to produce consecutive output symbols in each of which a plurality of carriers of different frequencies each have a selected phase and amplitude;

(b) mapping means for controlling the modulation of a carrier in accordance with a signal point constellation having a plurality of signal points, wherein at least two carriers are controlled in accordance with signal point constellations having mutually different numbers of points and wherein at least two constellations have a number of points not equal to a power of two:

wherein those constellations which have a number of points not equal to a power of two have a number of points equal to the smallest integer greater than $2^{m/n}$ where n is not a power of two.

DETAILED DESCRIPTION OF EXEMPLARY EMBODIMENTS

Figure 1:
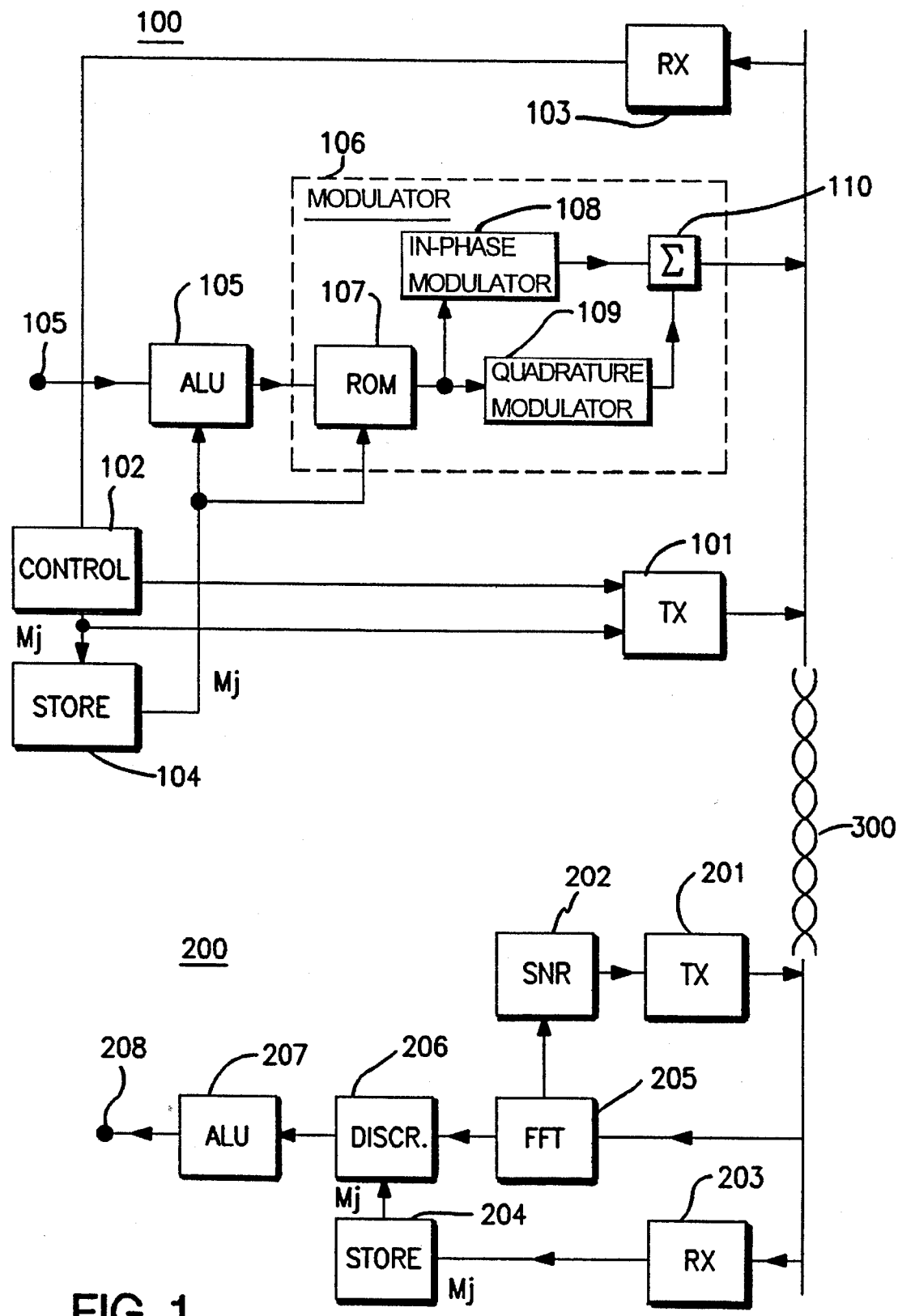
FIG. 1 is a schematic block diagram of a system constructed in accordance with an exemplary embodiment of this invention.

The basic principles of a first embodiment of the invention will now be described using a simple example in which data are to be transmitted at a rate of 48 kbit/s using six channels of 4 kHz bandwidth with carrier frequencies of 4, 8, 12, 16, 20 and 24 kHz. The spectrum 0–2 kHz is assumed to be available for a duplex signalling channel.

A transmitting station has six QAM modulators each operating at 4000 symbols/sec with a (potentially) non-integer number of bits per symbol (i.e., the signal constellations used are not constrained to have a number of points equal to a power of two). On these figures, the number of bits per multi-carrier symbol is 12 and the average number of bits/symbol in one channel is 2. Allocation of the required transmission capacity among the channel is performed on the basis of a measurement of the properties of the path between the stations.

Thus, transmission of useful data is preceded by a start-up phase in which a carrier is transmitted on each channel from the transmitting station to a receiving station. The receiving station measures the signal-to-noise ratio $S_j$ (j=1 . . . 6) for each channel and communicates the results of the measurements to the transmitter.

A number of algorithms are known for calculating integer numbers of bits among channels according to channel SNR. This embodiment employs a version of an algorithm proposed by Chow, modified to permit any size of constellation to be used.

In principle, a constellation having any number of points may be permitted to be chosen for any channel, though practical considerations will usually dictate some constraints to be placed upon the choice, as will be seen later. In this simple example, no such constraint is made.

For this example, suppose that the result gives the following constellation sizes:

| 4kHz | 8kHz | 12kHz | 16kHz | 20kHz | 24kHz |
|------|------|-------|-------|-------|-------|
| 19,  | 8,   | 9,    | 0,    | 3,    | 0     |

Thus, two channels are unusable, the remainder carrying just over 4, 3, just over 3, and just over 1 bit respectively. The product of the constellation sizes is 4104, just over the 4096 combinations required to transmit 12 bits.

The constellation sizes 19, 8, 9, 0, 3, 0 are stored at the transmitting station and transmitted via the signalling channel to the receiving station to the receiver, where they are also stored. In order to control the four symbols to be transmitted, the 12 input bits are regarded as representing a binary number in the range 0 to 4095 and this is converted into a five-digit mixed-base number where the bases are the desired constellation sizes (mixed-base numbers will be familiar to those accustomed to measuring in feet and inches). Each digit then controls a respective one of the modulators.

Suppose that 12 bits to be transmitted are 0111, 0010, 1101 (=$1837_{10}$). Assuming that the bases are in the order given above, this may be written as:

$$8_{19} \ 4_8 \ 0_9 \ 1_3$$

Where (from right to left, the digits represent 1, 0×3, 4×$27_{10}$, and 8×$216_{10}$).
Thus the modulators transmit
  symbol No. 8 of 19
  symbol No. 4 of 8
  symbol No. 0 of 9
  symbol No. 1 of 3
The numbering of the points in the constellations is (in this example) arbitrary.

At the receiving station, the multi-frequency symbol is received and decoded to recover the numbers 8, 4, 0, 1. This could be done by means of a bank of six bandpass filters feeding six QAM demodulators, through it may be more convenient (especially when a larger number of carriers is used) to employ a Fast Fourier Transform to obtain the real and imaginary coordinates of the six carriers, which can then be decoded in the usual way. The numbers are then multiplied progressively by the stored bases 8, 9, 3 to give:

$$
\begin{array}{r}
8 \times 8 = 64 \\
4 \\
\overline{68} \times 9 = 612 \\
0 \\
\overline{612} \times 3 = 1836 \\
1 \\
\overline{1837}
\end{array}
$$

Note that the stored bases of zero for the 16 and 24 kHz carriers indicate that any received signal in these channels should be ignored. Also that the base 19 for the most significant channel is not needed by the receiver for the calculation—though it is needed for identifying the constellation.

Although not done above—to simplify the example, the 8 kHz channel, since it carries an integer number of (3) bits, could be taken out of the base conversion computation at both stations, merely being transmitted independently by the 8 kHz carrier.

If the characteristics of the transmission path are reasonably stable, the constellation sizes may, once selected, remain constant for the duration of the transmission. Alternatively, the receiving station may periodically measure the signal-to-noise-ratio and transmit the results to the transmitting station. The latter may then assess the results, and in the event of a significant change, revise its allocation, and notify the receiver, via the signalling channel, of the new sizes and the time instant at which switching to the new signals is to occur. Obviously this will require transmission of carrier on any currently unused channels (16 and 24 kHz in this example).

The apparatus shown in FIG. 1 is designed to transmit data at a rate of 1.544 Mbit/s using 238 subchannels, it being supposed than an available bandwidth of 1.024 MHz is divided into 256 channels of 4 kHz bandwidth, with the lowest 72 kHz (18 channels) reserved for other purposes such as telephony and a duplex control channel. A symbol rate of 4000 symbols/sec is assumed, so that the average bits per multichannel symbol is 386 and the average bits per channel for one symbol is approximately 1.62. In an ADSL environment it is expected that many subchannels will be totally unusable, whilst others may be capable of carrying one, two or more bits. It is unlikely that any will be able to carry more than 11 bits. These figures are, of course, merely one example.

In the version shown in FIG. 1, a transmitting station 100 transmits to a receiving station 200 over a copper pair 300; the receiving station having a control transmitter 201 for returning signalling information via the duplex control channel. Allocation of the 256 bits among the 238 channels is performed on the basis of the results of a start up sequence in which a transmitter 101 is instructed by means of a control unit 102 to transmit a test carrier on each channel simultaneously. At the receiving station 200 a unit 202 measures the signal-to-noise ratio in each channel and communicates the results by means of the control transmitter 201 to the transmitting station 100 where they are received by a control channel receiver 103 and forwarded to the control unit 102.

One of the functions of the control unit 102 is to calculate the number of points to be used in accordance with the following algorithm which is based on that proposed by Chow, Peter S. Chow "Bandwidth Optimised Digital Transmission Techniques for Spectrally Shaped Channels with Impulse Noise", dissertation, Dept. Elec. Eng., Stanford University, May 1993, modified to accommodate non-integer numbers of bits/symbol. It iteratively finds an approximately optimum transmit power margin (i.e., lowest bit error rate) over a limited number of iterations and then (if need be) performs a somewhat cruder adjustment to reach the desired number of bits. It proceeds as follows:

1. Define a power margin Y (representing the difference between the actual power and that needed for transmission at the desired bit error rate) initially as Y=0 dB, Initially total number of bits B and number of points $m_j$ for the j'th channel are also zero.

2. For each channel (j=1 . . . N) calculate $$m_j = \left(1 + \frac{S_j}{9.8 + \gamma}\right) \quad (1)$$

From which the largest whole number of points that can be carried by the channel is:

$$\hat{m}_j = \text{Interger}(m_j) \text{ (i.e. rounded down)} \quad (2)$$

And the fractional loss of "points" in the rounding process $$\Delta m_j = m_j - \hat{m}_j \quad (3)$$

If for any channel $\hat{m}_j$ is one or zero, then a count U of the number of channels used is decremented from N by the number of unused channels.

3. The total number of combinations is:

$$M = \prod_{j=i}^{N} m_j$$

and the total number of bits is B=integer ($\log_2 M$); if this is zero, transmission is not possible. Declare a bad channel and stop.

4. Compute a new value of Y according to $$\gamma = \gamma + 10 \log_{10}\left(2\frac{B - B_t}{u}\right)$$

where $B_t$ is the target number of bits to be carried.

5. If B≠$B_t$, and a desired limit on the number of iterations has not been reached, reset $m_j$ and B to zero and go to step 2.

6. If B>$B_t$, then subtract one point from the channel that has the smallest value of $\Delta m_j$, adjust $\Delta m_j$ accordingly and repeat if necessary until B=$B_t$.

7. If B<$B_t$ then add one point to the channel that has the largest value of $\Delta m_j$, adjust $\Delta m_j$ accordingly and repeat if necessary until B=$B_t$.

8. Adjust power levels if required in individual channels.

9. Adjust total power so that a desired total power level is attained.

Once the constellation sizes $m_j$ have been ascertained, this information is stored in a store 104, and transmitted via the control transmitter 101, to the receiving station 200 where a control receiver 203 forwards it to a control store 204.

Transmission may now commence. Data received at an input 105 are processed by an arithmetic processing unit 105 to produce, from each group of 386 input bits a number U of binary codes representing the values of the digits of a mixed base number in accordance with the U non-zero values $m_j$ stored in the store 104, in the manner described above. These bits are then supplied to a modulator 106.

The modulator uses each four-bit code, along with the corresponding value of $m_j$ to access a read only memory 107 containing the coordinates of all the constellations in use, the coordinate values being applied to in-phase and quadrature modulators units 108, 109 whose outputs are combined 110 and supplied to the line 300.

This representation is, in fact, rather schematic in practice modulating 256 carriers in this way would be performed by a digital signal processing device which would synthesize the desired waveform directly, for example using an inverse Fast Fourier Transform, At the receiver, the received signals are analyzed using a Fast Fourier Transform (205) as mentioned above. The resulting coordinates pass to a QAM demodulator 206 which, using the $m_j$ values in the store 204, identifies the transmitted point for each carrier. The output of this feeds an arithmetic unit 207 which multiplies the received digits by the $m_j$ values as described earlier to provide a decoded output at an output 208.

The allocation algorithm described, and the base conversion process, while satisfactory, are computationally intensive with large numbers of channels. Some additional measures may be taken to alleviate this. In the example described with reference to FIG. 1, rounding to a whole number of bits occurs only on the whole 238 channels. Consequently the base conversion process has to be performed on a 386-bit input word. This can be simplified by combining channels into groups, and constraining each group to carry a whole number of bits. For example, one might divide the 238 channels into groups of six (or rather, 39 groups of six and one of four). In this case step 3 of the algorithm becomes $$M_1 = \prod_{j=1}^{6} m_j, M_2 = \prod_{j=7}^{12} m_j$$

$$B_1 = \text{Integer}(M_1) \quad B_2 = \text{Integer}(M_2)$$

$$B = \sum_{k=1}^{40} B_k$$

The base conversion for each group can proceed independently and is therefore much quicker as it involves fewer divisions.

Another modification that may speed convergence of the bit allocation algorithm, is to increment the constellation size by a chosen fraction of a bit, e.g., ⅓ or ⅙ bit rather than one point at a time. Note that the present method makes it easy to choose constellation sizes of $2^{m/n}$ (where n is not a power of two). A ⅙ bit resolution corresponds to step increases in constellation size of about 12%, so with constellation sizes up to 8 or so there is no difference, but with larger constellations there is a significant saving—for example steps of 30 rather than 1 on a 256 bit constellation.

As mentioned earlier, dynamic reallocation may be provided for if required. One possibility is a complete recalculation, another is a small adjustment in the event of deterioration of one (or more) channel's SNR accompanied by an improvement in another, where capacity can be shifted from one to the other. If the channels are in groups carrying integer numbers of bits then readjustment within a group is straightforward, but transfers between one group and another need to be limited to a whole number of bits.

It may also be noted that in the case of constellations having a number of points which is not a power of two, but is divisible by two (or by a higher power of two)—either because this occurs with the bit allocation algorithm described, or because the allocation algorithm is modified to constrain the number to be so divisible—then the word which determines the point selection may comprise a portion consisting of one (or more) unmodified input bits and a portion derived by the base conversion process whereby the first portion selects among two (or four, eight etc) groups of points and the second portion selects one of the (odd, or at least non-power of two number of) points within the group.

Divisibly by four may be preferred to achieve (in conventional manner) robustness against 90° phase rotations by using differential coding on two bits which select among equivalent points in four quadrants.

If desired, conventional coding schemes such as those employing convolutional codes may be employed to provide redundancy which can be exploited by a soft decision decoder at the receiving station.

Other considerations that may arise in the bit allocation are:

(i) receiver technology may place a practical limit on the number of bits that may be carried by one channel. This may be implemented by hard-limiting the value of $\hat{m}_j$ in steps (1) and (2) of the algorithm to a predetermined maximum; and (ii) it may arise that each channel has a power constraint on it. In this case step (8) above would set the power levels accordingly, this being taken into account prior to the calculation of step 1 either by measuring the SNR at the derived power for the relevant channel, or by scaling the SNR figures according to the desired maximum power.

Finally, an alternative bit-allocation algorithm is given below, being a modification of that proposed by Hughes-Hartogs (U.S. Pat. Nos. 4,679,227, 4,731,816 and 4,833,706). It is described below assuming a resolution of ⅓ bit, so that l and $b_j$ are not integers but are integer multiples of ⅓. This proceeds as follows:

1. Measure the signal-to-noise ratio of each channel as a function of transmit power.

2. From this, calculate, for a desired bit error rate, the power $P_i$ required to transmit i bits and more particularly the incremental power $\Delta P_i$ needed to transmit i rather than i−1 bits; i.e. $\Delta P_i = P_i - P_{i-1}$ (where $P_0 \equiv 0$). A set of results $\Delta P_{ij}$ is formed, where j is the channel number, for j=1 . . . . N and N is the number of channels. The range of i must go up at least to the largest expected number of bits per channel.

3. Initially the number of bits $b_j$ carried by the jth channel is zero for all j, as are the total number of bits B and the total transmit power P.

4. Assign, ⅓ bit at a time, the total number of bits to be transmitted among the available channels, each time choosing the channel that requires the least amount of incremental power to support an additional ⅓ bit; viz.

find the smallest value of $\Delta P_{bj+1,j}$;

assign ⅓ bit—i.e. $b_j = b_{j+1}$—to the channel having this value of j.

5. Update B and P.

6. If (for margin optimization) B has reached a target value or (for data rate optimization) P has reached a target value, stop; otherwise repeat from step 4.

Additional changes that may be made are:

(a) rather than transmitting SNR measurements to the transmitting station, the receiving station could itself perform the bit allocation calculation, and communicate the results (i.e., the $m_j$) to the transmitting station.

Finally, it may be noted that other methods may be used for mapping a whole number of bits to a set of symbols selected from constellations some or all of which have a number of points not equal to a power of two, for example the shell mapping algorithm proposed by G. Lang and F. Longstaff "A Leech Lattice Modem", JSAS, August 1989 (see also CCITT Draft Recommendation V. 34); the algorithm being modified for constellations of mutually different sizes.

I claim:

1. An apparatus for transmission of data using quadrature amplitude modulation, said apparatus comprising:
  (a) modulation means controllable to produce consecutive output symbols in which a plurality of carriers of different frequencies each have a selected phase and amplitude;
  (b) mapping means for controlling modulation of a carrier in accordance with a signal point constellation having a plurality of signal points, wherein at least two carriers are controlled in accordance with signal point constellations having mutually different numbers of points and wherein at least two signal point constellations have a number of points not equal to a power of two;
  (c) conversion means operable to receive a group of bits to be transmitted by two or more carriers controlled in accordance with signal point constellations having a number of points not equal to a power of two and to generate from the group of bits, considered as a binary number, the digits of a number having the same numerical value, the base of each digit being the number of points in the signal point constellation employed for a respective carrier, the mapping means being responsive to a respective digit to select a point from the relevant signal point constellation.

2. An apparatus as in claim 1 including:
  means for receiving signal quality reports from a receiver,
  means for determining, as a function of the signal quality reports, a signal point constellation size for each channel, and
  means for communicating the signal point constellation sizes to the receiver.

3. An apparatus as in claim 1 in which the mapping means is arranged to control at least one carrier in accordance with a signal point constellation having a number of points which is the product of an even and an odd number, and is responsive to one or more input bits not processed by the conversion means to select between an even number of groups of points and to the respective said digit to select among the points of a group.

4. An apparatus for transmission of data using quadrature amplitude modulation, said apparatus comprising:
  (a) modulation means controllable to produce consecutive output symbols in which a plurality of carriers of different frequencies each have a selected phase and amplitude;
  (b) mapping means for controlling modulation of a carrier in accordance with a signal point constellation having a plurality of signal points, wherein at least two carriers are controlled in accordance with signal point constellations having mutually different numbers of points and wherein at least two signal point constellations have a number of points not equal to a power of two;
  (c) conversion means operable to receive a group of bits to be transmitted by two or more carriers controlled in accordance with signal point constellations having a number of points not equal to a power of two and to generate from the group of bits, in accordance with a shell mapping algorithm, a set of numbers each identifying a point within a respective signal point constellation.

5. An apparatus for transmission of data using quadrature amplitude modulation, said apparatus comprising:
  (a) modulation means controllable to produce consecutive output symbols in which a plurality of carriers of different frequencies each have a selected phase and amplitude;

(b) mapping means for controlling modulation of a carrier in accordance with a signal point constellation having a plurality of signal points, wherein at least two carriers are controlled in accordance with signal point constellations having mutually different numbers of points and wherein at least two signal point constellations have a number of points not equal to a power of two;

wherein those signal point constellations which have a number of points not equal to a power of two have a number of points equal to the smallest integer greater than $2^{m/n}$ where n is not a power of two.

6. A method for transmission of data using quadrature amplitude modulation, said method comprising:

(a) controllably producing consecutive output symbols in which a plurality of carriers of different frequencies each have a selected phase and amplitude;

(b) controlling the modulation of a carrier in accordance with a signal point constellation having a plurality of signal points, wherein at least two carriers are controlled in accordance with signal point constellations having mutually different numbers of points and wherein at least two signal point constellations have a number of points not equal to a power of two;

(c) receiving a group of bits to be transmitted by two or more carriers controlled in accordance with signal point constellations having a number of points not equal to a power of two and generating from the group of bits, considered as a binary number, the digits of a number having the same numerical value, the base of each digit being the number of points in the signal point constellation employed for a respective carrier, and mapping responsive to a respective digit to select a point from the relevant signal point constellation.

7. A method as in claim 6 including:

receiving signal quality reports from a receiver, determining, as a function of the signal quality reports, a signal point constellation size for each channel, and communicating the signal point constellation size to the receiver.

8. A method as in claim 6 in which at least one carrier is controlled in accordance with a signal point constellation having a number of points which is the product of an even and an odd number, and in response to one or more input bits not processed in step (c) selecting one group from an even number of groups of points, each said group containing an odd or non-power of two number of points, and in response to the respective said digit selecting one of an odd or non-power of two number of points.

9. A method for transmission of data using quadrature amplitude modulation, said method comprising:

(a) controllably producing consecutive output symbols in which a plurality of carriers of different frequencies each have a selected phase and amplitude;

(b) controlling modulation of a carrier in accordance with a signal point constellation having a plurality of signal points, wherein at least two carriers are controlled in accordance with signal point constellations having mutually different numbers of points and wherein at least two signal point constellations have a number of points not equal to a power of two;

(c) receiving a group of bits to be transmitted by two or more carriers controlled in accordance with signal point constellations having a number of points not equal to a power of two and generating from the group of bits, in accordance with a shell mapping algorithm, a set of numbers each identifying a point within a respective signal point constellation.

10. A method for transmission of data using quardature amplitude modulation, said method comprising:

(a) controllably producing consecutive output symbols in which a plurality of carriers of different frequencies each have a selected phase and amplitude;

(b) controlling modulation of a carrier in accordance with a signal point constellation having a plurality of signal points, wherein at least two carriers are controlled in accordance with signal point constellations having mutually different numbers of points and wherein at least two signal point constellations have a number of points not equal to a power of two:

wherein those signal point constellations which have a number of points not equal to a power of two have a number of points equal to the smallest integer greater than $2^{m/n}$ where n is not a power of two.

11. A system for transmitting data using QAM and comprising:

(a) modulation means for controllably producing consecutive output symbols in which a plurality of carriers of different frequencies each have a selected phase and amplitude; and (b) mapping means for controlling modulation of a carrier in accordance with a signal point constellation having a plurality of signal points where at least two carriers are controlled in accordance with signal point constellations having mutually different numbers of points and wherein at least two signal point constellations have a number of points not equal to a power of two.

12. A method for transmitting data using QAM, said method comprising:

(a) controllably producing consecutive output symbols in which a plurality of carriers of different frequencies each have a selected phase and amplitude; and (b) controlling modulation of a carrier in accordance with a signal point constellation having a plurality of signal points where at least two carriers are controlled in accordance with signal point constellations having mutually different numbers of points and wherein at least two signal point constellations have a number of points not equal to a power of two.

\* \* \* \* \*